(12) United States Patent
Whiting (10) Patent No.: US 7,500,678 B1
(45) Date of Patent: Mar. 10, 2009

(54) AIRPLANE SKI LIFT

(76) Inventor: Spencer C. Whiting, 12237 Mountain Ash Dr., Baxter, MN (US) 56425

( * ) Notice: Subject to any disclaimer, the term of this patent is extended or adjusted under 35 U.S.C. 154(b) by 512 days.

(21) Appl. No.: 11/198,752

(22) Filed: Aug. 8, 2005

Related U.S. Application Data (60) Provisional application No. 60/686,895, filed on Jun. 3, 2005.

(51) Int. Cl.
*B62B 13/18* (2006.01)
*B64C 25/52* (2006.01)

(52) U.S. Cl. .............................. 280/9; 280/11; 244/108

(58) Field of Classification Search ................. 280/8, 280/9, 10, 11, 7.12; 244/105, 108
See application file for complete search history.

(56) References Cited

U.S. PATENT DOCUMENTS

| | | | |
|---|---|---|---|
| 2,106,934 A | | 2/1938 | Sawlnier |
| 2,315,098 A | * | 3/1943 | Simpson et al. ......... 244/102 R |
| 2,532,611 A | * | 12/1950 | Ditter ......................... 244/108 |
| 2,650,048 A | | 8/1953 | Woychik |
| 2,718,367 A | * | 9/1955 | Doolittle ..................... 244/105 |
| 2,733,026 A | | 1/1956 | Ditter |
| 2,864,624 A | * | 12/1958 | Dreyer et al. ................. 280/11 |
| 2,977,073 A | * | 3/1961 | Ditter et al. .................. 244/108 |
| 3,010,682 A | | 11/1961 | Moss et al. |
| 3,128,065 A | * | 4/1964 | Landes ........................ 244/108 |
| 3,552,515 A | * | 1/1971 | Tomita ........................ 180/184 |
| 3,790,109 A | * | 2/1974 | Fischer ....................... 244/105 |
| 4,026,502 A | | 5/1977 | Masclet |
| 4,027,835 A | * | 6/1977 | Sachs .......................... 244/101 |
| 4,390,151 A | * | 6/1983 | Schneider .................... 244/108 |
| 5,253,825 A | * | 10/1993 | Christian ..................... 244/108 |
| 5,439,237 A | * | 8/1995 | Kutchie ........................ 280/11 |
| 6,527,282 B2 | * | 3/2003 | Ouellette .................... 280/7.14 |
| 6,824,147 B2 | * | 11/2004 | Ouellette .................... 280/7.14 |
| 6,932,359 B2 | * | 8/2005 | Ouellette .................... 280/7.14 |
| 6,983,943 B2 | * | 1/2006 | Ouellette ....................... 280/28 |
| 7,055,779 B1 | * | 6/2006 | Discher ....................... 244/108 |
| 7,290,774 B2 | * | 11/2007 | Despres ........................ 280/28 |
| 2007/0007387 A1 | * | 1/2007 | Zimmerle et al. ............ 244/108 |

* cited by examiner

*Primary Examiner*—Jeffrey J Restifo
(74) *Attorney, Agent, or Firm*—Richard John Bartz (57) ABSTRACT

A ski lift for an airplane having skis has a body transversely rotated with a shaft on a ski and an axle secured to the body rotatably supporting a wheel. A bar secured to the body engages the ski to limit rotational movement of the body and locate the axle and wheel in engagement with a support surface laterally of the vertical plane of the shaft to retain the ski above the support surface. A handle is used to manually rotate the body and angularly move the axle and wheel.

19 Claims, 6 Drawing Sheets

AIRPLANE SKI LIFT

CROSS REFERENCE TO RELATED APPLICATION

This application claims the benefits of U.S. Provisional Application Ser. No. 60/686,895 Filed Jun. 3, 2005.

FIELD OF THE INVENTION

This invention relates to light airplane landing gear technology wherein the landing gear includes snow skis. More particularly the invention relates to portable wheel ski lifts mounted on the skis used only for ground handling of airplanes.

BACKGROUND OF THE INVENTION

Light aircraft used in winter environments having snow, slush and ice covered air fields, landing and takeoff areas and lakes have landing gear equipped with snow skis. The skis have elongated bodies with generally flat bottom surfaces that slide along snow and ice surfaces. Airplane taxi roads, parking and fueling areas and hangers are normally cleared of snow and ice exposing the bare ground, roadway surface and hanger floor. Airplanes equipped with snow skis are not normally taxied on hard surfaces as the airplanes can nose over due to the resistance to movement of the skis along these hard surfaces. Also, the skis can be damaged as they slide along the hard surfaces. Combination snow skis and wheels have been designed to allow use of the skis on snow and ice surfaces and wheels on hard surfaces. The wheels remain attached to the skis during takeoff, flight and landing of the airplane. Examples of combined airplane landing gear having combined snow skis and wheels are illustrated in the following U.S. patents.

R. Sulnier in U.S. Pat. No. 2,106,934 discloses an airplane landing gear having combined skis and wheels. A plurality of linkages connect the skis to horizontal beams mounted on the axles for the wheels. Hydraulic cylinders are operated to raise and lower the skis relative to the wheels to allow the airplane to be either supported on a surface with the skis or wheels. The wheels are permanent parts of the landing gear.

F. J. Ditter in U.S. Pat. No. 2,733,026 discloses an aircraft ski connected to a wheel movable to a down position to retain the ski in an elevated position above a support surface whereby the wheel supports the aircraft on the surface. A piston and cylinder assembly connected to a crank arm functions to selectively raise and lower the wheel relative to the ski.

W. K. Landes in U.S. Pat. No. 3,128,065 discloses an aircraft ski having a generally flat runner portion and a raised pedestal portion surrounding a landing wheel receiving well accommodating a landing wheel. An axle assembly for the wheel is journaled on ski trunnions secured to the pedestal portion of the ski. A shock cord and safety cable attached to the toe and heel of the ski controls the attitude of the ski. The ski is a flotation device that prevents the wheel from bogging down in snow, swampy areas and muskeg. The wheel is a permanent part of the landing gear.

R. J. Schneider in U.S. Pat. No. 5,390,151 discloses an aircraft ski associated with a steerable castering tail wheel. The ski has a pedestal straddling the wheel. A wheel axle pivotally attaches the ski pedestal to the landing gear. The wheel is a permanent part of the landing gear.

SUMMARY OF THE INVENTION

The ski lifts of the invention functions to elevate light airplanes up off snow skis and onto wheels for the purpose of ground handling the airplanes. The ski lifts are only used when the airplanes are on the ground. The ski lifts are portable, relatively small in size and lightweight lift structures that are removed from the skis prior to takeoff of the airplane. Attachment and removal of the ski lifts from the skis does not require special tools and jacks nor modification of the skis or landing gears of the airplanes.

The ski lift is usable with an airplane having a landing gear equipped with a ski having an upright pedestal including an auxiliary sleeve with a transverse cylindrical passage. The ski lift has a body supporting a shaft and axle. The shaft has a size to rotatably fit in the transverse passage of the sleeve and support the ski lift on the ski. A wheel is rotatably mounted on the axle. A bar secured to the body is adopted to engage the ski or a pad mounted on the ski to limit angular movement of the body, axle and wheel in one direction relative to the ski and position the axle and wheel laterally or offset of the vertical plane of the longitudinal axis of the shaft or at an angle with respect to the vertical plane of the shaft. The wheel engages the support surface and locates the ski above the support surface when the bar engages the ski. The weight of the airplane maintains the bar in engagement with the ski and the axle and wheel in the offset position whereby the wheels associated with each ski lift support the airplane on the support surface and permit movement of the airplane with the skis above the support surface. A tubular member, pipe, or tube secured to the body has an upright passage or socket for a handle used to manually rotate the body to selectively raise and lower the ski. When the body is rotated in one direction, the wheel engages the support surface to lift the ski above the support surface and locate the bar in engagement with the ski and the axle and wheel in the offset position. The ski lifts are removed from the skis prior to takeoff of the airplane. The ski lifts are not attached to the skis during flight of the airplane.

The invention encompasses the method of raising and holding a ski attached to an airplane landing gear above a support surface with a ski lift having a body, a shaft secured to the body, an axle secured to the body, a wheel rotatably mounted on the axle, and a bar secured to the body engageable with the ski for limiting angular movement of the body, axle and wheel and locate the axle and wheel laterally or offset from the vertical plane of the shaft. The shaft is rotatably mounted on the ski for rotation about an axis transversely of the length of the ski. The body, axle and wheel are angularly moved in one direction until the bar engages the ski, the wheel engages the support surface and the ski is elevated above the support surface. The axle and wheel are located laterally or offset from the vertical plane of the shaft so that the weight of the airplane retains the ski lift in a position to maintain the ski above the support surface. The wheels of the ski lifts on the two skis support the airplane on the support surface and permit movement of the airplane with the skis above the support surface.

DETAILED DESCRIPTION OF THE DRAWING

Figure 1:
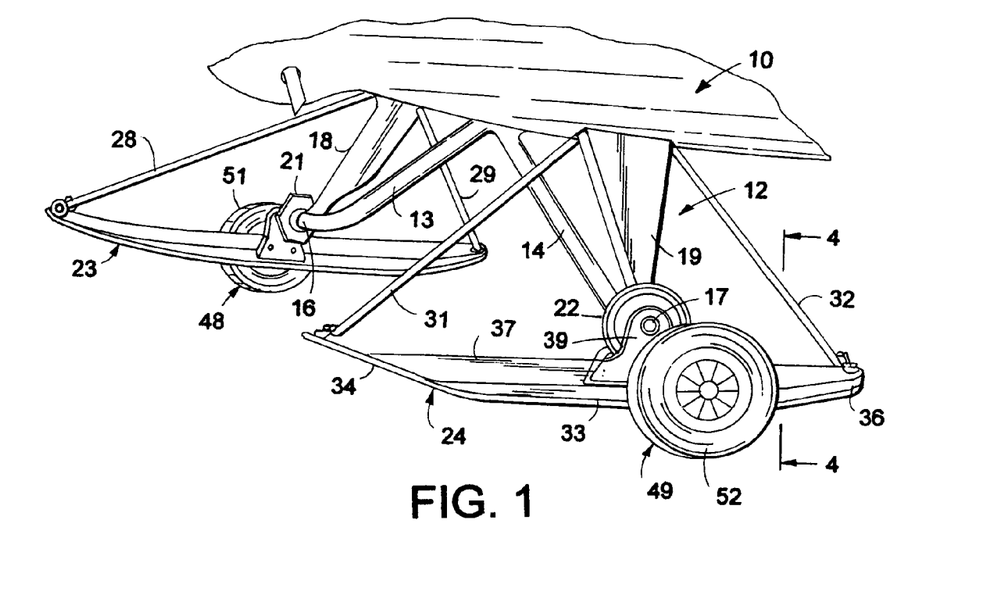
FIG. 1 is a perspective view of an airplane equipped with skis and wheel ski lifts of the invention.

As shown in FIG. 1, a forward portion of an airplane 10 has a conventional landing gear 12 including a pair of downwardly and outwardly extended struts 13 and 14. Struts 13 and 14 have bottom ends terminating in outwardly directed cylindrical axles 16 and 17. Axles 16 and 17 are adapted to accommodate ground engaging wheels. Airplane 10 is a light aircraft known as a tail dragger. Other types of airplanes with landing gear having skis can use the ski lifts of the invention. Braces 18 and 19 extend downwardly from the fuselage of airplane 10 to the outer ends of struts 13 and 14 to reinforce and stabilize landing gears 12. Brake assemblies 21 and 22, such as shoe or caliper brakes, are also mounted on the outer ends of struts 13 and 14. Landing gear 12 can have other structures with outwardly extended axles for accommodating wheels and skis.

Figure 2:
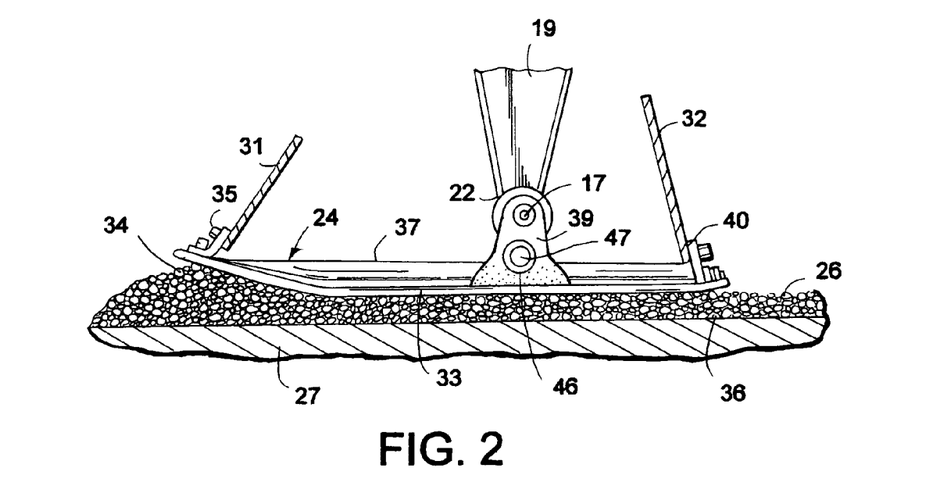
FIG. 2 is a side elevational view of an airplane ski mounted on the landing gear strut of an airplane.

As shown in FIGS. 1 to 4, airplane landing skis 23 and 24 are mounted on axles 16 and 17. Skis 23 and 24 are elongated longitudinal runners adapted to support aircraft on snow, ice and soft surfaces in winter weather conditions. Taxing of the airplane is limited as skis 23 and 24 are not susceptible to bare ground, concrete or hard surfaces that are not covered with snow or ice. This limits the taxing or traveling of the airplane on the ground. FIG. 2 shows ski 24 on a snow surface 26 covering a hard surface 27, such as a runway or ground. Cord riggings, shown in FIG. 1, and cables 28 and 29 secured to forward and aft portions of ski 23 and cables 31 and 32 secured with connectors 35 and 40 to forward and aft portions of ski 24 limit rotation of skis on axles 16 and 17, stabilize the skis and maintain the skis in forwardly and upwardly sloping or incline positions. Ski toe cables 28 and 31 are adjusted to have zero slack. Cord riggings are conventional construction associated with airplane skis.

Figure 4:
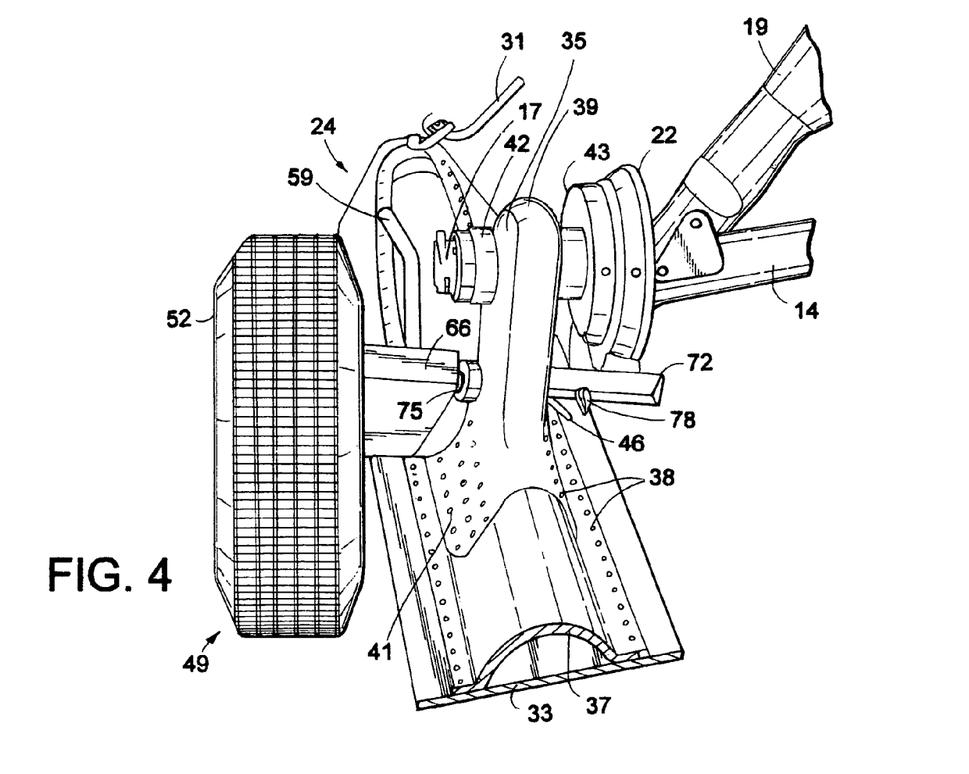
FIG. 4 is an enlarged sectional view taken along the line 4-4 of FIG. 1.

Skis 23 and 24 are identical structures. The following description is limited to ski 24 with the understanding that ski 23 has the same parts and arrangement of parts. Ski 24 has a longitudinally elongated body 33 having an upwardly directed nose or front end portion 34 and short upwardly and rearwardly directed rear end or aft portion 36. An elongated convex-shaped member 37 secured with fasteners 38, such as rivets, to the top of body 33 reinforces body 33. An upwardly extended tower or pedestal 39 is secured to a middle section of member 37, as shown in FIGS. 1, 2 and 4. Fasteners 41, shown as rivets, attach the U-shaped base of pedestal 39 to member 37. The upper end of pedestal 39 has lateral collars or cylindrical bosses 42 and 43 providing inside cylindrical bearing surfaces for axle 17. A pin 44 extended through a hole in the outer end of axle 17 retains ski 24 on axle 17. Other types of removable retainers can be used to maintain ski 24 and axle 17. The middle portion of pedestal 39 adjacent the top of member 37 has an auxiliary transverse tubular sleeve 46 extended across and secured to pedestal 39 and projected a short distance from opposite sides of pedestal 39, as shown in FIG. 4. Sleeve 46 has a transverse cylindrical passage or aperture 47 adapted to accommodate an axle of a conventional wheel assembly (not shown) associated with ski 24. The ski lift of the invention does not use the conventional wheel assembly. The entire ski 24 including sleeve 46 is constructed with lightweight metal, such as an aluminum alloy, fiberglass or wood. Plastics, such as ultra high density polyethylene, can be used to protect the bottom of the ski.

Figure 5:
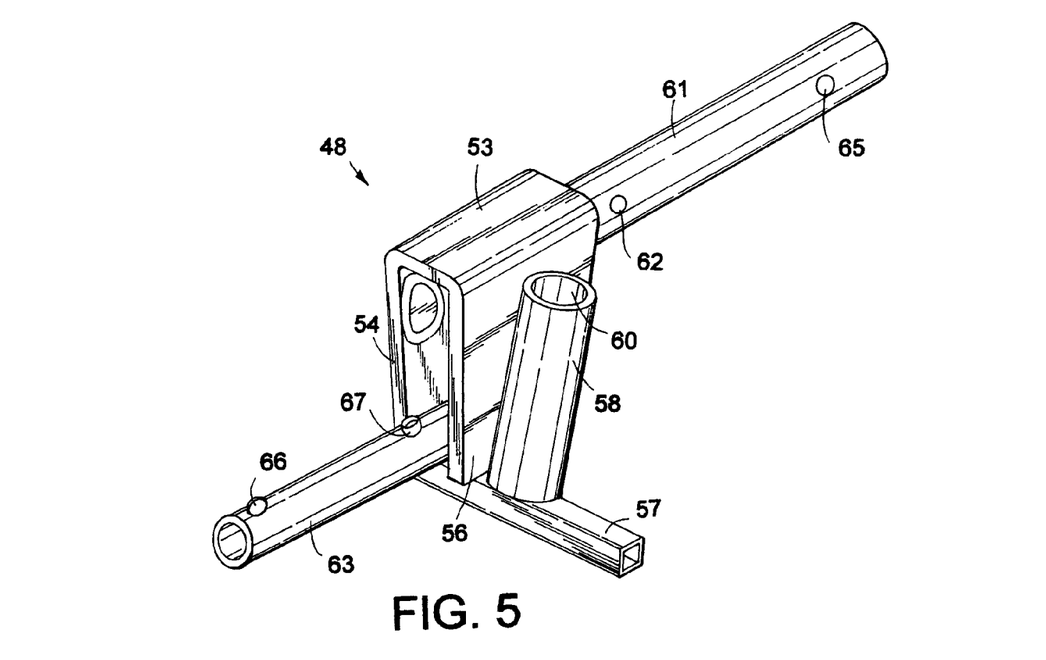
FIG. 5 is a perspective view of a ski lift without a wheel.
Figure 6:
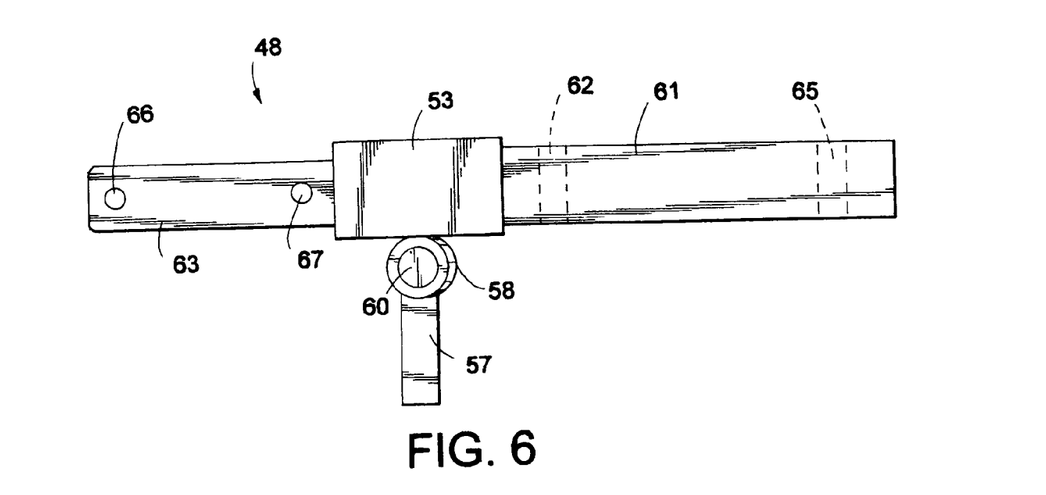
FIG. 6 is a top plane view of the ski lift of FIG. 5.
Figure 10:
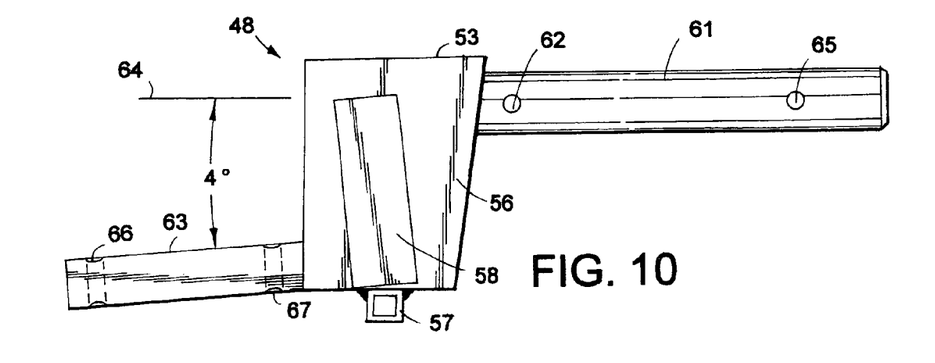
FIG. 10 is a right side elevational view of the ski lift of FIG. 5.
Figure 11:
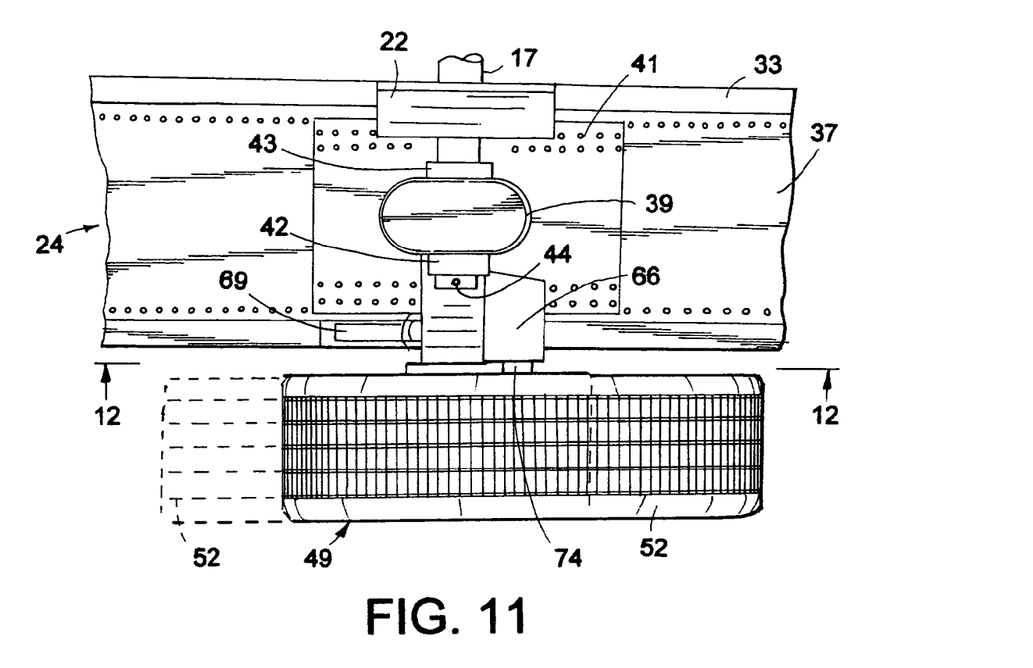
FIG. 11 is an enlarged sectional view taken along line 11-11 of FIG. 3.

Ski lifts 48 and 49 associated with the pedestals of skis 23 and 24 are used to hold skis 23 and 24 above ground or hard surface 27 whereby airplane can be taxied or manually moved to a desired location, such as a fuel station or hanger. Ski lifts 48 and 49 are only used for ground handling or taxing the airplane. They are removed from the skis prior to takeoff of the airplane. Ski lifts 48 and 49 are relatively small and lightweight metal devices having rubber tire wheels 51 and 52 that movably supports skis 23 and 24 on a surface, such as the ground or hard floor. Tandem wheel assemblies can be used with the ski lifts. As shown in FIGS. 4 and 11, the inside wall of wheel 52 is laterally spaced from the adjacent edge of ski 24. In use, wheel 52 does not contact the edge of ski 24. Ski lift 48, shown in FIGS. 5, 6 and 10 without wheel 51, is used with right ski 23. Ski lift 48 has an inverted U-shaped body 53 with downwardly converging side walls 54 and 56 having upper and lower portions. The bottom ends of walls 54 and 56 are secured to a lateral tubular bar 57 that functions as a stop arm to limit angular movement of body 53 and retain wheel 51 in a counterclockwise over-center or lateral position to retain ski 23 above a support surface, such as ground or floor surface 27. A tubular cylindrical member, tube or pipe 58 secured to wall 56 extends upwardly from bar 57. Pipe 58 has a socket 60 adapted to accommodate an elongated rod or handle 59 used to manually turn body 53 to selectively raise and lower wheel 51. Handle 59 is removable from pipe 58 to save weight and space. A shaft 61 has an end located between and secured with welds to the upper ends of walls 54 and 56. Shaft 61 extends in a horizontal direction away from body 53. Shaft 61 has a circumferential surface that rotatably fits into passage 47 of sleeve 46 secured to pedestal 39 of ski 23. Holes 62 and 65 in shaft accommodates lock pins to retain shaft 61 in assembled relation with pedestal 39. The lower ends of walls 54 and 56 are located adjacent opposite sides of the inner end of cylindrical axle 63. Welds secure axle 63 to walls 54 and 56. Axle 63 extends or cants downwardly and outwardly from body 53 at an angle of about 4 degrees relative to the longitudinal axis 64 of shaft 61 as seen in FIG. 10. Axle 63 can be horizontal or slope downwardly at different angles. Axle 63 has holes 66 and 67 for retainers to rotatably hold wheel 51 on axle 63.

Figure 7:
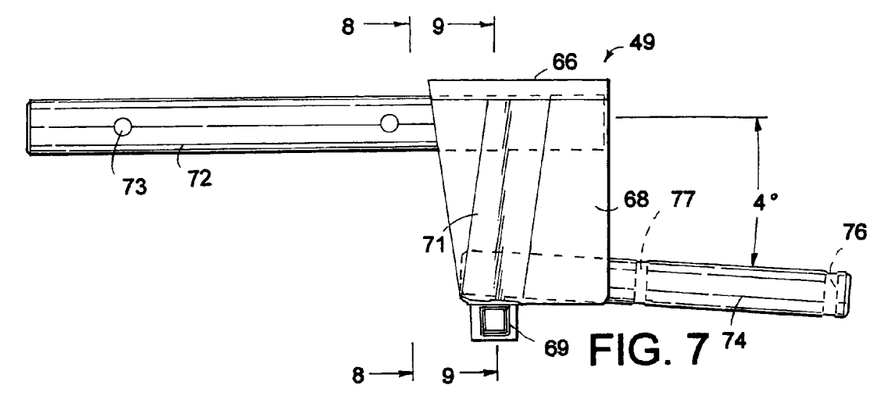
FIG. 7 is a right side elevational view of the ski lift adapted to be mounted on left ski 24.
Figure 8:
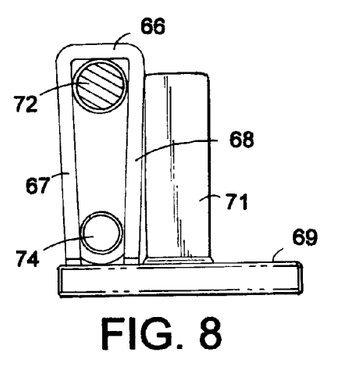
FIG. 8 is a sectional view taken along line 8-8 of FIG. 7.
Figure 9:
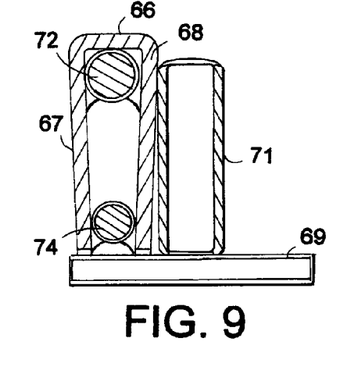
FIG. 9 is a sectional view taken along the line 9-9 of FIG. 7.

Ski lift 49, shown in FIGS. 3, 4 and 7 to 9, has an inverted U-shaped body 66 with downwardly converging side walls 67 and 68. Walls 67 and 68 have bottom ends secured with welds to a laterally extended bar 69 that functions as a stop to limit counterclockwise angular movement of body 66 and retain ski 24 in an elevated location above ground or hard surface. A tubular member, tube or pipe 71 secured to wall 68 with welds extends upwardly from bar 69 as seen in FIGS. 8 and 9. Pipe 71 inclines outwardly at an angle of about 8 degrees relative to a vertical axis of body 66. Other incline angles including a vertical location of pipe 71 on body 66 can be used. A shaft 72 having a hole 72 and an inner end located between walls 67 and 68 is welded to walls 67 and 68. Shaft 72 has a diameter and circumference that rotatably fits in and extends through passage 47 in auxiliary sleeve 46 of pedestal 39 as shown in FIG. 4. Pins 75 and 78, shown in FIG. 4, extends through holes 73 and 83 to retain body 66 adjacent pedestal 39. An axle 74 shown in FIGS. 7 and 8, extends downwardly away from the lower ends of walls 67 and 68. The inner end of axle 74 located between walls 67 and 68 is welded to walls 67 and 68. Axle 74, shown in FIG. 7, is canted at an angle of about 4 degrees relative to the longitudinal axis of shaft 72. Other inclines and angles can be used for axle 74. The downwardly sloping or canted axles 63 and 74 allow the wheels 51 and 52 to have a straight and vertical orientation when supporting the weight of the airplane. Holes 76 and 77 in axle 74 accommodate removable fasteners or pins that rotatably retain wheel 52 on axle 74.

Figure 3:
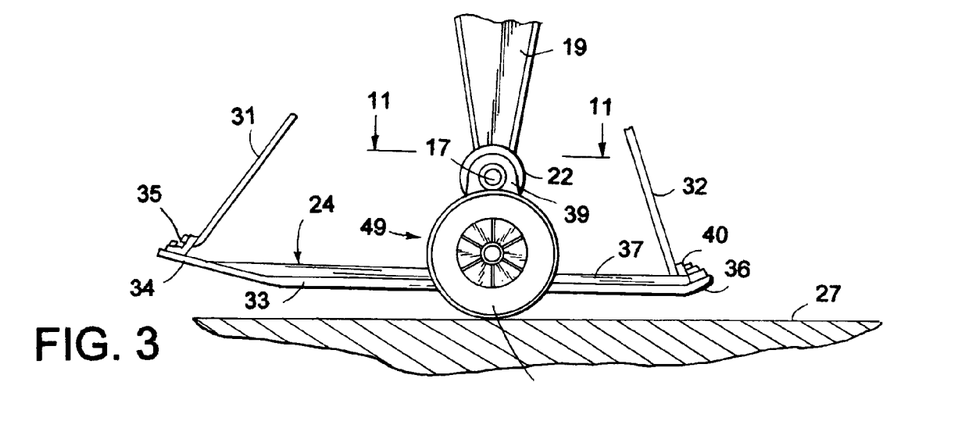
FIG. 3 is a side elevational view of an airplane ski and wheel ski lift supporting the ski above a support surface.
Figure 12:
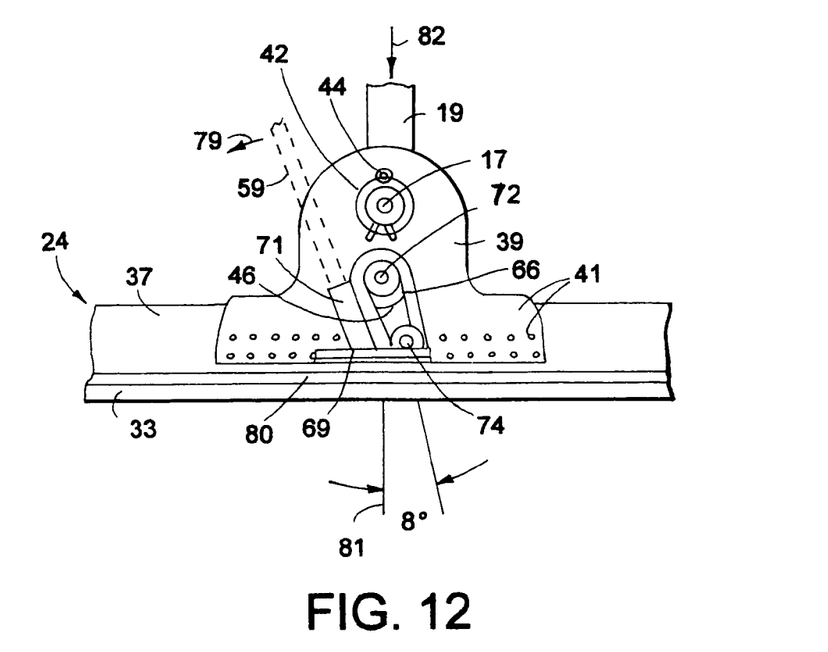
FIG. 12 is a sectional view taken along the line 12-12 of FIG. 11.

Referring to FIGS. 11 and 12, wheel 52 is located in the counterclockwise over-center position which locates ski 24 above a support surface. Shaft 72 is positioned in passage 47 of sleeve 46 on pedestal 39. Lock pin 78, shown in FIG. 4, is connected to shaft 72 to maintain ski lift 49 in assembled relative location with pedestal 39. The ski lift 49 is initially located in a forward position as shown in broken lines in FIG. 11. Ski 24 is on the support surface. Handle 59 is inserted into pipe 71 and pulled forward as shown by arrow 79. Body 66 is rotated counterclockwise approximately 90 degrees about the longitudinal axis of shaft 72 thereby angularly moving axle 74 and wheel 52 to an over-center or offset position relative to the vertical plane 81 of the longitudinal axis of shaft 72. As shown in FIG. 12, bar 12 extends forwardly and bears against a pad or spacer 78 to limit counterclockwise rotation of body 66 to about 81 degrees counterclockwise relative to vertical plane 81 of the axis of shaft 72. Rivets are used to secure pad 78 to a top portion of ski 24. Pad 78 distributes forces of bar 69 on ski 24 and protects the surface of the ski. One or more pads 78 can be used to adjust the over-center location of axle 74. The forward end of bar 69 can directly engage the top of ski 24. Also, the length of bar 69 can be selected to vary the over-center location of axle 74 and wheel 52. The weight of the airplane indicate by arrow 82 in FIG. 12 maintains axle 74 and wheel 52 in the over-center position and bar 69 in its stop position on pad 78 or directly on ski 24. When wheel 52 is in the over-center position ski 24 is elevated above the hard support surface as shown in FIG. 3. Ski lift 48 for ski 23 functions in the same way as ski lift 49 to maintain ski 23 above the hard support surface. The weight of the airplane maintains ski lift 49 in the over-center position with ski 23 above the hard support surface.

Ski lifts 48 and 49 may release and lower the skis 23 and 24 to engage the ground. This can occur when attempting to roll the airplane backward into a hanger over a bump or an ice ridge. The right and left ski lifts 48 and 49 can be reversed or mounted on opposite skis. The over-center stop bars extended toward the airplane's tail limit clockwise movement of the ski lifts thereby preventing the skis from engaging the ground when the airplane is moved backward.

Figure 13:
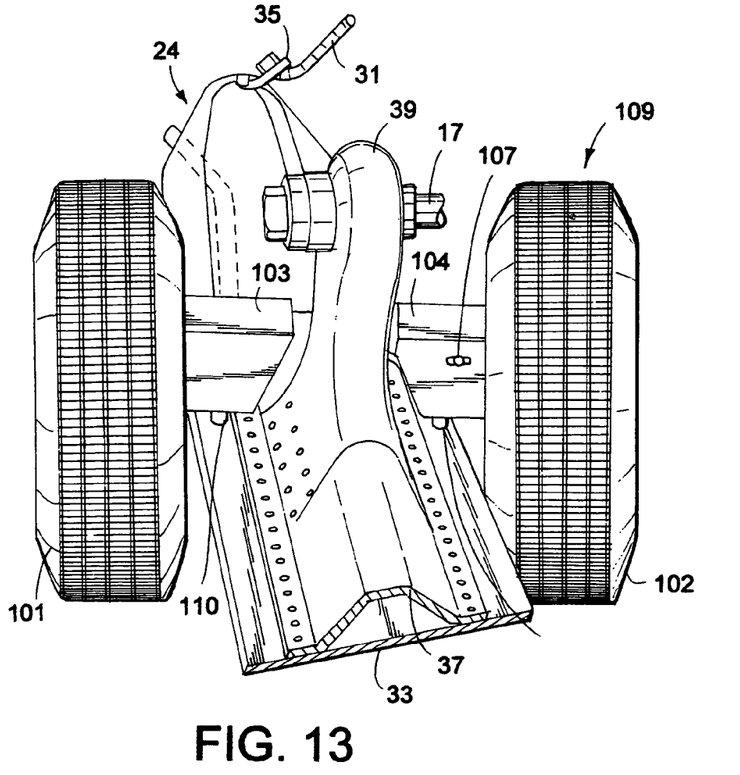
FIG. 13 is a perspective view similar to FIG. 4 showing a pair of wheel ski lifts associated with an airplane ski.
Figure 14:
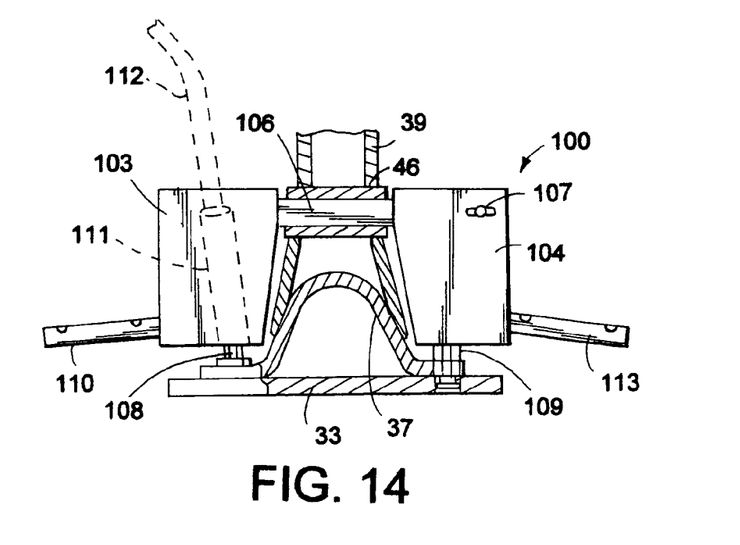
FIG. 14 is a right side elevation view of the pair of wheel ski lifts of FIG. 13 mounted on an airplane ski shown in cross section.

A modification of the ski lift 48 identified by the reference number 100, and shown in FIGS. 13 and 14, has two wheels 101 and 102 located adjacent opposite sides of pedestal 39. Wheels 101 and 102 are sized to allow the inside wheel 102 to clear landing gear strut 14 and brake assembly 22. Inverted U-shaped bodies 103 and 104 are connected with a shaft 106. A releasable fastener 107, such as a pin connects body 104 to shaft 106. Shaft 106 is welded to body 103. Bars 108 and 109 secured to the bottom of bodies 103 and 104 extend forwardly and functions as stops to limit counterclockwise movement of bodies 103 and 104 and hold ski 24 in an elevated position above a hard surface. A first axle 110 rotatably supports wheel 101. The inner end of axle 110 is secured with welds to body 103. Axle slopes downwardly away from body 103 at an angle of approximately 4 degrees. An upright sleeve or tube 111, shown in FIG. 14, secured to the front side of body 103 accommodates an upright handle 112 used to manually turn bodies 103 and 104 to move the bodies 103 and 104 to over-center positions about 8 degrees past center and selectively raise or lower ski 24, as shown in FIG. 13. A second axle 113 rotatably supports wheel 102. The inner end of axle 113 is secured with welds to body 104. Axle 113 slopes downwardly away from body 104 at an angle of about 4 degrees. The sloping or canted axles 109 and 113 ensure that wheels 101 and 102 are straight and vertical when supporting the weight of the airplane. Body 103, shaft 106 and axle 109 has the same structure and function as ski lift 49 shown in FIGS. 7-9, 11 and 12.

While there has been shown and described preferred embodiments of the ski lifts of the invention, it is understood that changes in size, shapes and arrangement of the elements of the ski lifts including the wheels may be made by persons skilled in the art without departing from the invention.

The invention claimed is:

1. A ski lift usable with an airplane having a landing gear equipped with snow ski having an upright pedestal including an auxiliary sleeve having a transverse cylindrical passage comprising:
    an inverted U-shaped body having laterally spaced downwardly extended side walls, said side walls having upper portions and lower portions,
    a linear cylindrical shaft having a longitudinal axis, an inner end position located between and secured to the upper portions of the side walls and an outer end portion extend away from the side walls, said outer end portion of the shaft being of a size and length to rotatably extend through the passage of the sleeve,
    fastener means for retaining the shaft in rotatable relationship with the sleeve,
    a linear cylindrical axle having an inner end portion located between and secured to the lower portions of the side walls and an outer portion extended away from the side walls in a direction opposite the extent of the shaft,
    a wheel rotatably mounted on the outer portion of the axle,
    a linear bar secured to the lower portion of the side walls below said axle, said bar extended in a direction normal to said shaft and adapted to engage the ski to limit rotational movement of the body relative to the longitudinal axis of the shaft in one direction and position the axle and wheel mounted on the axle laterally of a vertical plane containing the longitudinal axis of the shaft, and
    an upright tubular member secured to a side wall having a passage adapted to accommodate a handle usable to manually rotate the body in a direction whereby the wheel engages a support surface and the ski is raised and retained above the support surface when the bar engages the ski.

2. The ski lift of claim 1 wherein: the outer portion of the axle extends downwardly and outwardly away from the side walls of the body.

3. The ski lift of claim 1 wherein: the outer end portion of the shaft extends in a general horizontal direction way from the side walls of the body.

4. The ski lift of claim 1 wherein: the shaft and axle are located in a common plane.

5. The ski lift of claim 1 wherein: the outer portion of the shaft extends in a horizontal direction away from the side walls of the body and the outer portion of the axle extends downwardly and outwardly away from the side walls of the body in a direction opposite the horizontal direction of the shaft.

6. A ski lift usable with an airplane having a landing gear equipped with a snow ski having an upright pedestal including a sleeve having a transverse cylindrical passage comprising:

a body comprising an inverted U-shaped member, a shaft having a longitudinal axis secured to the U-shaped member and extended generally horizontally in one direction from said U-shaped member adapted to rotatably fit in the passage of the sleeve for angular movement about said longitudinal axis, an axle secured to the U-shaped member and located below the shaft and extended in a direction opposite the one direction away from the U-shaped member, a wheel rotatably mounted on the axle, a bar secured to the body adapted to engage the ski to limit rotational movement of the body in one direction relative to the ski and position the axle and wheel mounted on the axle laterally of a vertical plane containing the longitudinal axis of the shaft, said bar being secured to the U-shaped member below said axle and extended in a direction normal to said shaft whereby the bar engages the ski in a location spaced from the U-shaped member when the wheel engages a support surface and the ski is in the elevated position shove the support surface, and a tubular member secured to the body adapted to accommodate a handle usable to manually rotate the body whereby the wheel engages a support surface and the ski is raised and retained in an elevated position above the support surface when the bar engages the ski.

7. The ski lift of claim 6 wherein: the axle extends downwardly and outwardly away from the body.

8. The ski lift of claim 6 wherein: the shaft and axle are located in a common plane.

9. The ski lift of claim 6 wherein: the U-shaped member has an upper portion and a lower portion, said shaft being secured to the upper portion of the U-shaped member, and said axle being secured to the lower portion of the U-shaped member, said shaft and axle extending in opposite directions away from the U-shaped member.

10. The ski lift of claim 6 wherein: the inverted U-shaped member is a one-piece member.

11. The ski lift of claim 6 including: at least one pad located between the bar and ski.

12. A ski lift usable with an airplane having a landing gear equipped with a snow ski having an upright pedestal including a sleeve having a transverse cylindrical passage comprising:

a first body, a shaft having a longitudinal axis secured to the first body adapted to rotatably fit in the passage of the sleeve for angular movement about said longitudinal axis, an axle secured to the first body, a wheel rotatably mounted on the axle, a bar secured to the first body adapted to engage the ski to limit rotational movement of the body in one direction relative to the ski and position the axle and wheel mounted on the axle laterally of a vertical plane containing the longitudinal axis of the shaft, a tubular member secured to the first body adapted to accommodate a handle useable to manually rotate the first body whereby the wheel engages a support surface and the ski is raised and retained in an elevated position above the support surface when the bar engages the ski, a second body attached to the shaft, a second axle secured to the second body, and a second wheel rotatably mounted on the second axle, said second body, second axle and second wheel being angularly moved upon rotation of the shaft whereby the second wheel engages the support surface and the ski is retained above the support surface with the wheel and second wheel.

13. The ski lift of claim 12 including: releasable means connecting the second body to the shaft allowing the second body to be removed from the shaft and the shaft removed from the sleeve whereby the ski engages the support surface.

14. The ski lift of claim 12 wherein: the shaft extends in a generally horizontal direction away from the body.

15. The ski lift of claim 12 wherein: the shaft extends in a horizontal direction away from the body and the axle extends downwardly and outwardly away from the body in a direction opposite the horizontal direction of the shaft.

16. The ski lift of claim 12 wherein: the shaft and axle are located in a common plane.

17. The ski lift of claim 12 wherein: the first body has an upper portion and a lower portion, said shaft being secured to the upper portion of the first body, and said axle being secured to the lower portion of the first body, said shaft and axle extending in opposite directions away from the first body.

18. The ski lift of claim 12 wherein: the body is a one-piece inverted U-shaped member.

19. The ski lift of claim 12 wherein: the first body is an inverted U-shaped member, said shaft being secured to said U-shaped member and extended generally horizontally in one direction away from the U-shaped member, said axle being located below the shaft and secured to the U-shaped member and extended in a direction opposite the one direction away from the U-shaped member, said bar being secured to the U-shaped member below said axle and extended in a direction normal to said shaft whereby the bar engages the ski in a location spaced from the U-shaped member when the wheel engages a support surface and the ski is in the elevated position above the support surface.

\* \* \* \* \*